United States Patent [19]
Akitomo

[11] 4,305,664
[45] Dec. 15, 1981

[54] SPECTROPHOTOMETER
[75] Inventor: Nubuo Akitomo, Ibaraki, Japan
[73] Assignee: Hitachi, Ltd., Tokyo, Japan
[21] Appl. No.: 126,693
[22] Filed: Mar. 3, 1980
[30] Foreign Application Priority Data Mar. 2, 1979 [JP] Japan .................................. 54/24959

[51] Int. Cl.³ .............................................. G01J 3/42
[52] U.S. Cl. .................................................... 356/323
[58] Field of Search ................................. 356/319–325

[56] References Cited

U.S. PATENT DOCUMENTS

| | | | |
|---|---|---|---|
| 3,071,037 | 1/1963 | Brumley | 356/324 |
| 3,465,143 | 9/1969 | Doonan | 356/325 X |
| 3,680,957 | 8/1972 | Fukuda | 356/325 |
| 3,927,944 | 12/1975 | Iwahashi et al. | 356/320 X |
| 4,180,327 | 12/1979 | Maeda et al. | 356/325 X |

*Primary Examiner*—F. L. Evans
*Attorney, Agent, or Firm*—Craig and Antonelli

[57] ABSTRACT

In a spectrophotometer of the single wavelength-double beam type or the dual wavelength type, light signals of predetermined periods having an interval during which reference light serving as a reference enters, an interval during which sample light to be measured enters and an interval during which entering light is intercepted are detected and converted into electric signals by means of a photomultiplier. The electric signals are converted into digital signals by means of an A/D converter. Using the digital signals, a digital processing unit executes operations for measuring the transmission factor or the absorption of a sample and operations for changing the supplied voltage of the photomultiplier so as to keep the reference signal constant at all times. On the basis of a voltage operated in the digital processing unit, the supplied voltage of the photomultiplier is changed in the interval during which the entering light is intercepted, whereby the stability of the feedback system is enhanced.

11 Claims, 4 Drawing Figures

SPECTROPHOTOMETER

BACKGROUND OF THE INVENTION

This invention relates to improvements in a spectrophotometer of the single wavelength—double beam type or the dual wavelength type employing the dynode feedback system.

In the spectrophotometer of the single wavelength—double beam type, the ratio of absorptions at any desired single wavelength between two cells, i.e., a sample cell and a reference cell, is measured. More specifically, monochromatic light of a single wavelength derived from a light source is chopped by a rotating sector mirror and a chopper into a sequence of light signals comprising sample light and reference light having predetermined periods, which signals alternately enter a sample cell and a reference cell situated in a sample chamber. The light signals from the sample cell and the reference cell are detected and converted into electric signals in the form of a sample signal and a reference signal, respectively, by means of a photomultiplier. On the basis of the sample signal and the reference signal thus obtained, the absorption and transmission factor of the sample are measured.

On the other hand, in the spectrophotometer of the dual wavelength type, the difference in the degree of absorption by a sample between two signals of different wavelength is measured for one sample cell. More specifically, light from a light source is separated by a monochromator into a light signal having a wavelength serving as the reference of the spectrum absorption of the sample to be measured and a light signal having any other desired wavelength. The light signals are caused to alternately enter the single sample cell by means of a chopper, and the resultant signals from the sample cell for the respective wavelengths are detected and converted into electrical signals by means of a photomultiplier. The difference in the degree of absorption at the two wavelengths thus obtained is measured.

With respect to the function of the photomultiplier, however, it may be considered in both the single wavelength—double beam type and the dual wavelength type that the one beam which is caused to enter in order to measure the absorption or transmission factor of the sample is the reference light serving as the reference, while the other beam is the sample light to be measured.

In spectrophotometers of these types, the photomultiplier is used as the detector, as stated previously. In the photomultiplier, a large number of electrodes called "dynodes" for emitting secondary electrons are disposed between an anode and a cathode. The photomultiplier accordingly has the characteristic that a linear relationship holds between the logarithmic indication of voltages applied thereto and the logarithmic indication of output currents thereof.

As an expedient for automatically controlling the applied voltage in consideration of such characteristics of the photomultiplier, there is the so-called dynode feedback method. The dynode feedback method will be explained by taking as an example the foregoing spectrophotometer of the single wavelength—double beam type. The light from the light source is chopped by the rotating sector mirror and the chopper into the sample light and the reference light, which alternately enter the sample cell and the reference cell. The light signals from the sample cell and the reference cell are respectively converted into the electric signals which comprise the sample signal and the reference signal by the photomultiplier. The signals from the photomultiplier are amplified by an amplifier. Thereafter, the voltage corresponding to the reference signal above is compared with a reference voltage in a differential amplifier, and the difference is supplied to a DC/DC converter. While the DC/DC converter applies a fixed voltage to the photomultiplier, it adjusts the applied voltage of the photomultiplier in accordance with the differential voltage from the differential amplifier and controls the reference signal from the photomultiplier so that it is constant at all times.

In this manner, the feedback control is made so as to render the reference signal constant, and the absorption and transmission factor of the sample are measured from the sample signal at that time.

In the spectrophotometer employing the dynode feedback method, the sample signal and the reference signal are alternately detected by the photomultiplier. When the latter signal is used to control the feedback, the applied voltage of the photomultiplier changes gradually during the detection of the sample signal. This leads to the problem that the stability of the feedback system is inferior. More specifically, when a signal processing system for the sample signal and the reference signal is provided by analog circuitry, the applied voltage of the photomultiplier changes in accordance with the time constant of the system. On the other hand, when the signal processing system is in the form of digital circuitry employing a counter, the applied voltage changes in accordance with the integration characteristics of the counter.

SUMMARY OF THE INVENTION

This invention has for its object to provide a spectrophotometer which employs dynode feedback of excellent stability.

In accordance with this invention, a period of time during which any light is intercepted is provided in addition to the periods of time during which two different lights for measuring the absorption or transmission factor of a sample enter a photomultiplier, and the applied voltage of the photomultiplier is adjusted during the period of time of the light interception so that a detected signal based on one of the other signals may become constant at all times. Thus, control is provided so as to prevent the applied voltage of the photomultiplier from changing during the application of the two different light signals into the photomultiplier, and the stability of a feedback system is enhanced.

DESCRIPTION OF THE PREFERRED EMBODIMENTS

Figure 1:
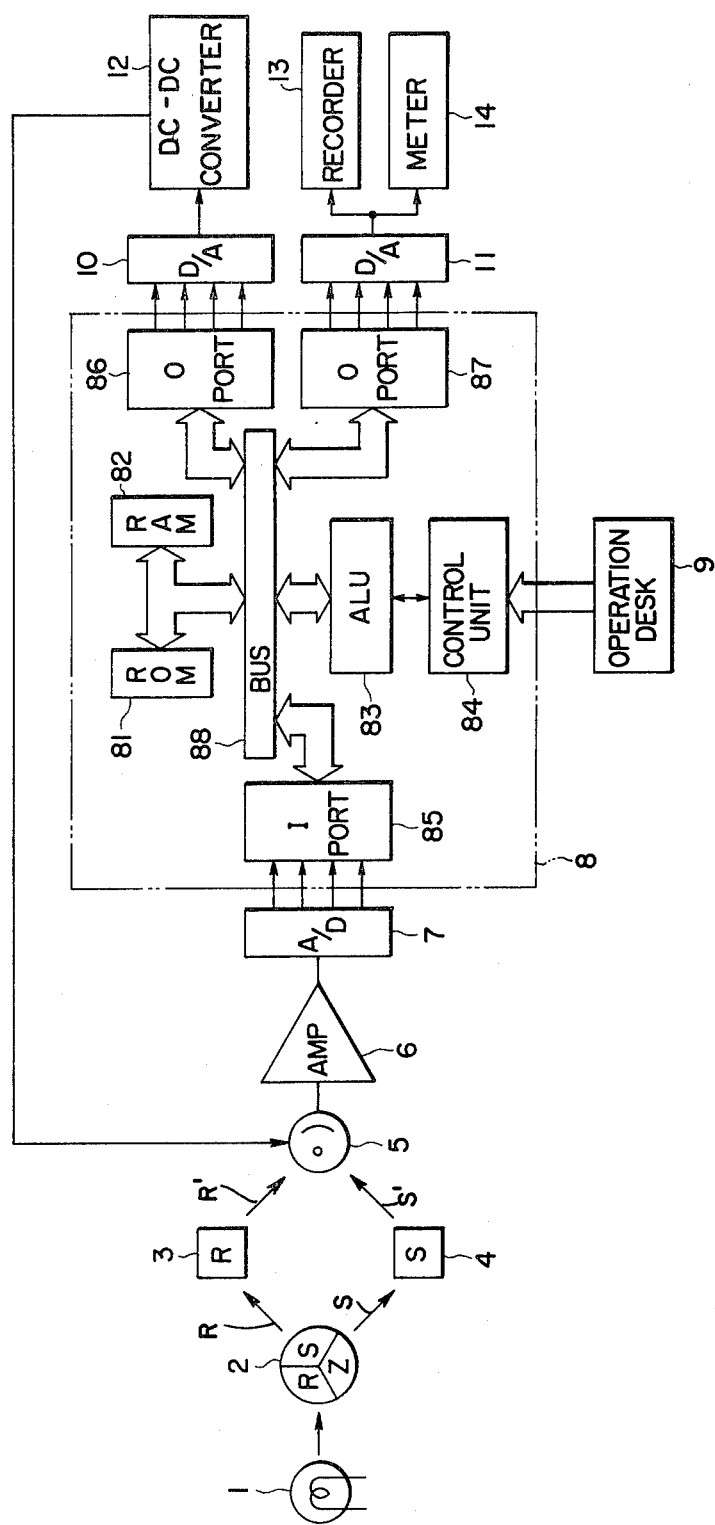
FIG. 1 is a block diagram showing the construction of a spectrophotometer in accordance with an embodiment of this invention.
Figure 3:
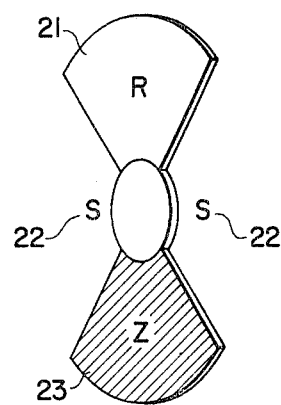
FIG. 3 is a perspective view showing in detail an example of a rotating sector mirror in FIG. 1.

An embodiment of this invention will be described with reference to FIG. 1. FIG. 1 shows the construction of a spectrophotometer of the single wavelength—double beam type. In the figure, monochromatic light of a single wavelength from a light source 1 is split by a rotating sector mirror 2 into light segments representing three states, to be described in detail later. As shown in FIG. 3, the rotating sector mirror 2 has a reflector portion 21, which reflects incident light from the light source 1 and provides reflected light, transmissive portions 22, which transmit the incident light as it is and provide transmitted light, and a nonreflective portion 23 which intercepts the incident light. The reflected light derived from the reflector portion 21 is used as reference signal light R to be directed onto a reference cell 3; the transmitted light of the transmissive portion 22 is used as sample signal light to be directed onto a sample cell 4; and the light intercepted by the nonreflective portion 23 provides for a zero light period of time.

These three light segments are extracted in predetermined periods by a chopper (not shown) which rotates in synchronism with the rotating sector mirror 2, so that the reference light signal enters the reference cell 3 in a sample chamber, while the sample light signal enters the sample cell 4. A photomultiplier 5 accordingly receives the respective light signals R' and S' during one revolution of the chopper, which represents one operating cycle, and these signals are received in first and second predetermined periods of a three period repetitive cycle in the order of receipt of the reference light R' from the reference cell 3, the sample light S' from the sample cell 4 and a third period during which the zero light signal is produced. The photomultiplier 5 converts each light signal into an electric signal. The reference signal and the sample signal detected by the photomultiplier 5 are directly related to the absorption state of the sample, and are used for the measurement of the double beam. On the other hand, the zero light signal includes the dark current of the photomultiplier 5, etc., superposed thereon, and is used to control feedback to the photomultiplier 5, as will be described below.

Accordingly, the reference signal and the sample signal are directly pertinent to a feedback value and are greatly affected by fluctuations in the feedback value, whereas the zero light signal is not directly pertinent to the feedback value. The present invention has been made with note taken of this point, and consists in that while the zero light signal is being extracted by the photomultiplier 5, feedback is applied to the photomultiplier 5 by a DC/DC converter 12 so as to control the applied voltage thereof. As a result, while the reference signal and the sample signal to be used for the measurement of the degree of absorption of the sample are being extracted, the applied voltage of the photomultiplier 5 does not change and is kept at a fixed value. Therefore, the disturbance of the feedback is avoided, and an improved stability of the system can be achieved.

The reference signal, the sample signal and the zero light signal which are provided successively in a respective manner from the photomultiplier 5 in predetermined periods of each cycle are amplified by an amplifier 6, and are thereafter converted into digital quantities by an A/D converter 7. As is well known, the A/D converter 7 is available in two types, i.e., the counting type and the comparison type, either of which may be used. A processing unit 8 having a microcomputer receives the output signals of the A/D converter 7, and executes various operations for measuring the absorption, transmission factor, etc., of the sample and processings for controlling the applied voltage of the photomultiplier 5.

The processing unit 8 is constructed of a ROM 81 in which programs for executing the aforecited operations and processings are stored in advance, a RAM 82 which stores various data results therein, an arithmetic and logic unit (hereinbelow, termed "ALU") 83 which fetches and decodes one-by-one the instructions of the program stored in the ROM 81 and executes operations as instructed and which has circuits for performing addition, subtraction, multiplication and division and the logic operations of OR, AND, EOR, etc., and a control unit 84 which makes controls along with the ALU 83 so that the operations may proceed smoothly as instructed, an input control port (hereinbelow, termed "I port") 85 which exchanges data with the A/D converter 7 and D/A converters 10 and 11, output control ports (hereinbelow termed "O ports") 86 and 87, and a bus 88 which connects in common the ROM 81, RAM 82, ALU 83, I port 85 and O ports 86 and 87. The control unit 84 is operated by means of an operation desk 9. More specifically, the operation desk 9 gives a measurement starting instruction, a standard level required for controlling the applied voltage of the photomultiplier 5, and set conditions required for ordinary measurements (scan speed, photometric mode, scale, band pass, response, etc.) by the use of keys.

Outputs from the processing unit 8 are applied to the D/A converter 10 through the O port 86 in one pass and to the D/A converter 11 through the O port 87 in the other pass. The output applied from the O port 86 determines the applied voltage of the photomultiplier 5 operated by the ALU 83, and is delivered to the DC/DC converter 12 through the D/A converter 10. On the other hand, the output applied from the O port 87 concerns the absorption or transmission factor of the sample operated by the ALU 83, and it is recorded in a recorder 13 and indicated on a meter 14 through the D/A converter 11. Of course, when the meter 14 provides a digital display, the output of the O port 87 may be directly used. Preferably, the D/A converters 10 and 11 are of the types in which ladder resistances are connected and which have a low operating speed.

The output of the D/A converter 10 applied to the DC/DC converter 12 is an instruction which raises or lowers the applied voltage of the photomultiplier 5. In conformity with the instructions, the DC/DC converter 12 generates a high voltage necessary for the photomultiplier 5.

Figure 2:
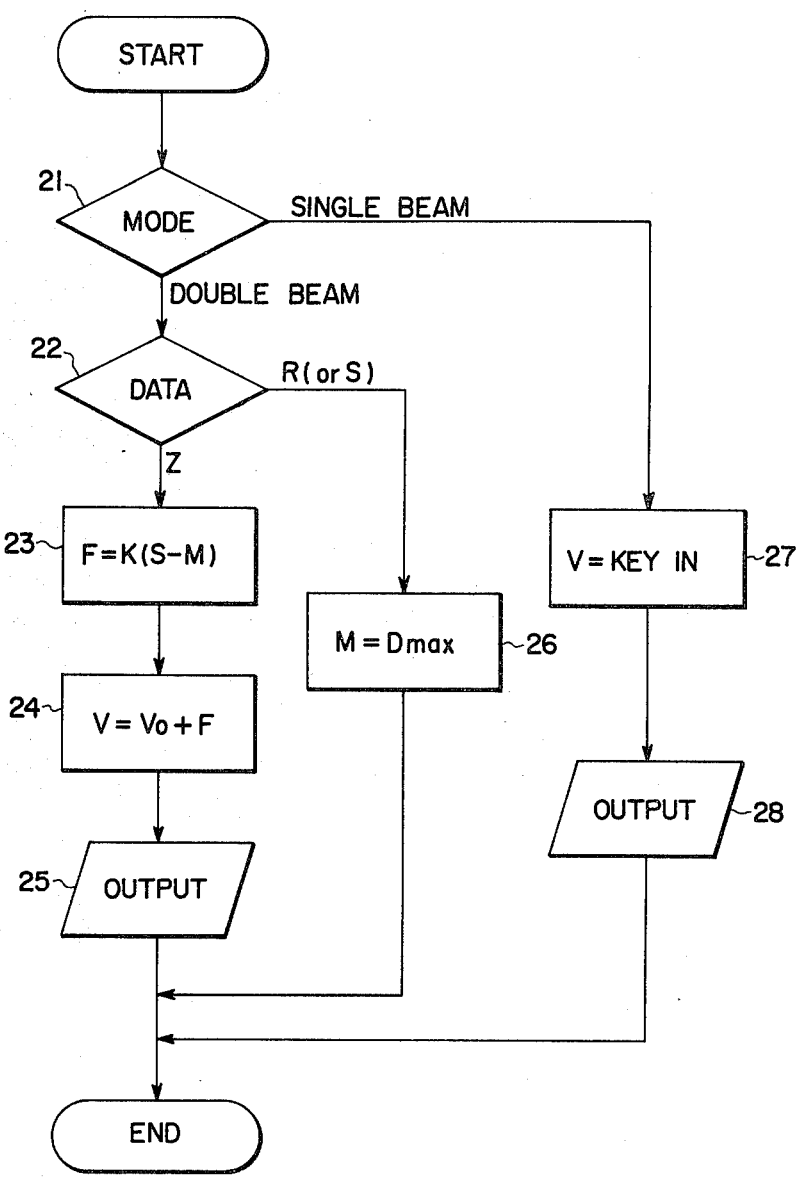
FIG. 2 is a flow chart of the operations of a processing unit in FIG. 1.

An operating program for keeping the reference signal from the photomultiplier 5 constant in the processing unit 8 is shown in FIG. 2. While the construction of FIG. 1 is of the single wavelength—double beam type, the system is also capable of measurements with a single beam. Therefore, the program illustrated in FIG. 2 adjusts the applied voltage of the photomultiplier 5 so that measurements may be possible with either the single beam or the double beam.

The operating program shown in FIG. 2 starts upon receipt of the measurement starting instruction of the operation desk 9. The condition of choosing a photometric mode is given to the control unit 84 by the operation desk 9.

First, there will be described a case where the single beam has been chosen as the photometric mode in a decision 21. In this case, in a processing step 27, the applied voltage V of the photomultiplier 5 becomes a set value keyed in from the operation desk 9. In an output 28, the output voltage V of the processing step 27 is provided from the O port 86. With the single beam, accordingly, the processing unit 8 determines the applied voltage of the photomultiplier 5 in conformity with the set value from the operation desk 9 and delivers it as the output.

Secondly, there will be described a case where the double beam has been chosen as the photometric mode in the decision 21. In this case, in a decision 22 following the decision 21, it is decided if the data being now received into the processing unit 8 is the reference signal, the sample signal or the zero light signal. Of course, when the extracted data is the reference signal and the sample signal, the absorption or transmission factor of the sample is evaluated in conformity with another operating program which is not shown. The absorption is obtained in terms of the ratio between the sample signal and the reference signal, while the transmission factor is obtained in terms of the ratio between the logarithms of both the signals. The operational result is delivered from the O port 87.

When, in the decision 22, the data of the present extraction is the reference signal or the sample signal, the flow shifts to a processing step 26. In the processing step 26, a greater value ($D_{max}$) between the reference signal and the sample signal is stored in the RAM 82. When the data subsequently received into the processing unit 8 is the zero light signal, the flow shifts to a processing step 23. In the processing step 23, a standard value (S) is read out from the RAM 82 because the standard value (S) is set from the operation desk 9 has been stored in the RAM 82 in advance, while the maximum data value ($M = D_{max}$) stored in the RAM 82 in the processing step 26 is similarly read out. The ALU 83 executes the operation of $F = K(S-M)$. Here, F denotes the quantity to be fed back from the DC/DC converter 12 to the photomultiplier 5. K denotes a gain which is set in order to prevent the system from causing hunting on account of an excessive feedback quantity F and which is stored in the ROM 81 in advance.

When the feedback quantity F has been obtained in the processing step 23, the flow subsequently proceeds to a processing step 24. In the processing step 24, the present applied voltage $V_o$ of the photomultiplier 5 already stored in the RAM 82 is read out and is subjected to an addition ($V_o + F$) with the foregoing feedback quantity F, thereby to obtain the desired value $V = (V_o + F)$ of the applied voltage of the photomultiplier 5 in the next sampling or extracting period of the reference signal or the sample signal. In the next processing step 25, the desired value V is delivered to the D/A converter 10 through the O port 86. Since the output of the D/A converter 10 has been $V_o$, it changes to V immediately upon the reception of the desired value V. While the output of the DC/DC converter 12 has been at a value corresponding to the present applied voltage $V_o$, it changes to the variation from the value $V_o$ to the desired value V, i.e., the feedback quantity F upon the reception of the desired value V. It is supplied to the photomultiplier 5.

With the above program, the operation of controlling the applied voltage of the photomultiplier 5 ends.

Thus, the data necessary for the measurement is solely extracted at the timings of the reference signal and the sample signal, while the feedback value is provided at the timing of the zero light signal to control the applied voltage of the photomultiplier 5 so as to keep the reference signal constant at all times. Therefore, the stability of the system is greatly enhanced.

Figure 4:
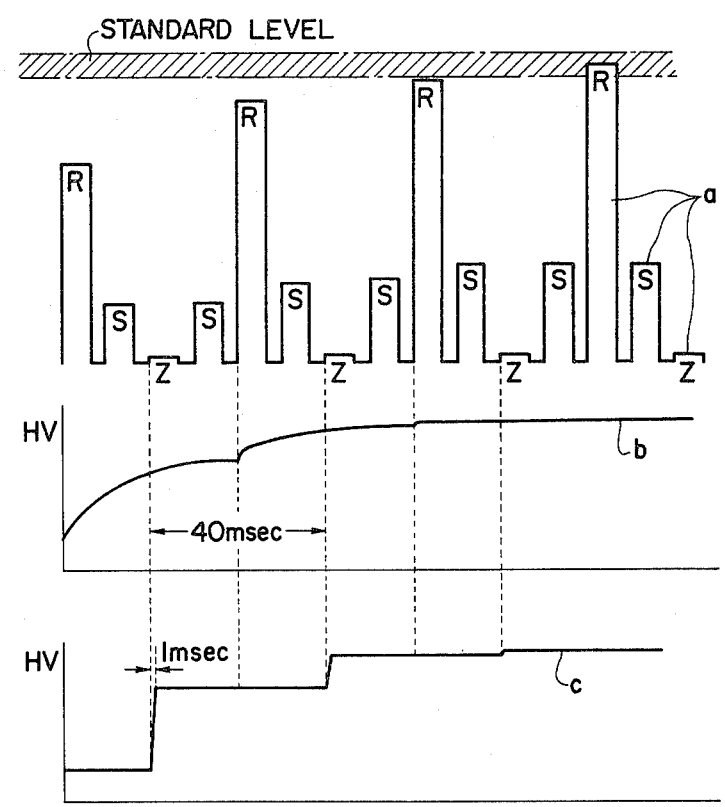
FIG. 4 is a waveform diagram for explaining the operation of the embodiment in FIG. 1.

FIG. 4 shows waveforms from the time of starting till the arrival of the reference signal at the standard level. The reference a in the figure indicates variations in the reference signal (R), the sample signal (S) and the zero light signal (Z) detected by the photomultiplier 5. Regarding the reference signal (R), the output HV of the DC/DC converter 12 ought to be changed so that the standard level may be reached on the basis of the first reference signal. Since, however, such changes of the output HV results in hunting, the foregoing gain K is set so that the standard level may be reached after a few cycles. The reference b in the figure illustrates the variation of the applied voltage of the photomultiplier 5 according to the prior art method, while c illustrates the variation of the applied voltage according to this invention. As seen from b, with the prior art method, the feedback is applied at the timing of the reference signal, and the applied voltage HV exponentially varies depending upon the time constant of the system. For this reason, the applied voltage HV changes at the time for extracting the sample signal necessary as the data, and the change appears as noise in the absorption or the transmission factor.

In contrast, according to this invention, the applied voltage HV changes like a step function as indicated at c, and moreover, it changes in the course of the extraction of the zero light signal. Therefore, the applied voltage HV undergoes no change during the extraction of the reference signal and the sample signal. As indicated in FIG. 4, in the spectrophotometer of this type, one cycle is set at approximately 40 msec, whereas the period of time required for the change of the applied volage HV is as short as approximately 1 msec. Therefore, the change of the applied voltage HV exerts no influence upon other parts of the system.

Although, in the above description, the feedback quantity has been based on the greater one of the values R and S, it may well be based on either value. The reference value may well be made a certain fixed value or a value within a certain fixed range.

This invention is especially effective in such a case where an analog signal needs to be counted by means of an A/D converter as when the output signal of a photomultiplier is subjected to an A/D conversion and then put into a processing unit and operated therein.

According to this invention, the stability of the system of the dynode feedback in the spectrophotometer can be enhanced.

Of course, the processings can be similarly carried out in the spectrophotometer of the dual wavelength type.

What is claimed is:

1. A spectrophotometer comprising:
   a light source;
   means for chopping light from said light source into segments comprising alternate first and second light signals in each of a plurality of successive operating cycles;
   means for transmitting said first light signals to a sample station where the absorption or transmission factor of the sample is to be measured while substantially blocking said second light signals;
   means including a detector for converting said first light signals downstream of said transmitting means and said sample station into first electric signals and for generating second electric signals during that part of each operating cycle during which said second light signals are blocked by said transmitting means, said detector being of a type to which an operating voltage is applied; and processing means responsive to said first electric signal for evaulating the absorption or transmission factor of a sample and responsive to said second electric signal for adjusting the operating voltage of said detector only during that part of each operating cycle during which said second light signal is produced by said chopping means.

2. A spectrophotometer as defined in claim 1, wherein said processing means includes means for evaluating the operating voltage of said detector in a given operating cycle on the basis of said second electric signal and means for adjusting said operating voltage for the following operating cycle on the basis of such evaluation.

3. A spectrophotometer as defined in claim 1, wherein said processing means comprises a digital computer.

4. A spectrophotometer as defined in claim 3, further including converter means responsive to a digital output of said processing means for applying said operating voltage to said detector.

5. A spectrophotometer as defined in claim 1, wherein said chopping means provides first light signals which each consist of a reference light signal to be applied to a reference cell and a sample light signal to be applied to a sample cell, and said processing means including means for controlling said operating voltage so that the output of said detector in response to said reference light signal is constant at all times.

6. A spectrophotometer as defined in claim 1, wherein said chopping means provides first light signals which each consist of a reference light signal having a wavelength serving as a reference of the spectrum absorption of the sample to be measured and a sample light signal having a wavelength different from that of said reference light signal, and said processing means including means for controlling said operating voltage so that the output of said detector in response to said reference light signal is constant at all times.

7. A spectrophotometer comprising a light source, a photomultiplier which detects light from said light source and converts it into an electric signal; optical means interposed between said light source and said photomultiplier for dividing the light from said light source into a reference light signal and a sample light signal necessary for measuring the absorption or transmission factor of a sample and a zero light signal resulting from the light of said light source being substantially blocked, including means for supplying these light signals to said photomultiplier in predetermined periods in succession; an A/D converter which converts the electric signals from said photomultiplier into digital signals; processing means responsive to the output signals relating to said reference and sample light signals from said A/D converter for measuring said absorption or transmission factor and responsive to the output signal relating to said zero light signal from said A/D converter for controlling the level of an operating voltage of said photomultiplier; external means for externally operating said processing unit; a D/A converter which converts into an analog signal an output signal from said processing means representing said operating voltage of said photomultiplier; and a DC/DC converter which generates said operating voltage of said photomultiplier in conformity with the output signal of said D/A converter; said processing means including means for controlling the operating voltage of said photomultiplier only during a time interval in which it is receiving an output signal from said A/D converter relating to the zero light signal from said photomultiplier.

8. A spectrophotometer comprising a light source; a photomultiplier which detects light from said light source and converts it into an electrical signal; optical means interposed between said light source and said photomultiplier for dividing the light from said light source into a reference light signal and a sample light signal necessary for measuring the absorption or transmission factor of a sample and a zero light signal resulting from the light of said light source being substantially intercepted, including means for supplying these light signals to said photomultiplier in predetermined periods in succession; and A/D converter which converts the electric signals from said photomultiplier into digital signals; processing means responsive to the output signals of said reference and sample light signals from said A/D converter for measuring said absorption or transmission factor and responsive to the output of said zero light signal from said A/D converter for evaluating the operating voltage of said photomultiplier in a given operating cycle on the basis of said zero light signal and for adjusting said operating voltage for the following operating cycle on the basis of such evaluation;

external means for externally operating said processing unit; a D/A converter which converts into an analog signal an output signal from said processing means representing said operating voltage of said photomultiplier; and a DC/DC converter which generates said operating voltage of said photomultiplier in conformity with the output signal of said D/A converter and controls said operating voltage of said photomultiplier during a time interval in which it is receiving the zero light signal from said photomultiplier;

wherein said processing means includes means for detecting whether the received data is a reference or sample signal necessary for the measurement or the zero light signal; means responsive to detection of a reference or sample signal for temporarily storing a maximum value ($D_{max}$) corresponding to these signals, means responsive to detection of the zero light signal for reading out the data ($D_{max}$) previously stored and for multiplying a difference value ($S - D_{max}$) determined from a preset standard value (S) by a predetermined coefficient (K) so as to evaluate a quantity to be fed back $\{F = K(S - D_{max})\}$ as the applied voltage of said photomultiplier; and means for evaulating a sum ($V = V_o + F$) between the present applied voltage ($V_o$) of said photomultiplier and the feedback quantity (F) and for delivering said sum (V) as the applied voltage of said photomultiplier.

9. A spectrophotometer as defined in claim 8, wherein said processing means comprises an arithmetic and logic unit which executes operations, a ROM in which programs for executing the operations are stored, a RAM in which operated results are stored, and a control unit which controls said arithmetic and logic unit.

10. A spectrophotometer comprising a light source; a photomultiplier which detects light from said light source and converts it into an electrical signal; optical means interposed between said light source and said photomultiplier for dividing the light from said light source into a reference light signal and a sample light signal necessary for measuring the absorption or transmission factor of a sample and a zero light signal resulting from the light of said light source being substantially intercepted, including means for supplying these light signals to said photomultiplier in predetermined periods in succession; an A/D converter which converts the electric signals from said photomultiplier into digital signals; processing means responsive to the output signals of said reference and sample light signals from said A/D converter for measuring said absorption or transmission factor and responsive to the output of said zero light signal from said A/D converter for evaluating the operating voltage of said photomultiplier in a given operating cycle on the basis of said zero light signal and for adjusting said operating voltage for the following operating cycle on the basis of such evaluation;

external means for externally operating said processing unit; a D/A converter which converts into an analog signal an output signal from said processing means representing said operating voltage of said photomultiplier; and a DC/DC converter which generates said operating voltage of said photomultiplier in conformity with the output signal of said D/A converter and controls said operating voltage of said photomultiplier during a time interval in which it is receiving the zero light signal from said photomultiplier;

wherein said processing means includes mode determining means responsive to said external means for indicating whether a single beam or a double beam mode of operation is to be used; at the single beam mode, said unit uses the applied voltage (V) of said photomultiplier a key input value set from said operation desk; means responsive to said mode determining means indicating the double beam mode for detecting whether the data subsequently received is a reference or sample signal necessary for the measurement or the zero light signal, means responsive to detection of a reference or sample signal necessary for the measurement for temporarily storing a maximum value ($D_{max}$) corresponding to these signals, means responsive to detection of the zero light signal for reading out the data ($D_{max}$) previously stored and for multiplying a difference value ($S - D_{max}$) determined from a preset standard value (S) by a predetermined coefficient (K) so as to evaluate a quantity to be fed back $\{F = K(S - D_{max})\}$ as the applied voltage of said photomultiplier, and means for evaluating a sum ($V = V_o + F$) between the present applied voltage ($V_o$) of said photomultiplier and the feedback quantity (F) and for delivering said sum (V) as the applied voltage of said photomultiplier.

11. A spectrophotometer comprising:

a light source;

means for chopping light from said light source into segments comprising alternate first and second light signals in successive operating cycles, said first light signal being necessary for measuring an absorption or transmission factor of the sample, said second light signal having the light of said light source substantially intercepted;

means including a detector for converting said first and second light signals into respective first and second electric signals, said detector being of a type to which an operating voltage is applied; and processing means responsive to said first electric signal for evaluating the absorption or transmission factor of a sample and responsive to said second electric signal for evaluating the operating voltage of said detector in a given operating cycle on the basis of said second electric signal and means for adjusting said operating voltage for the following operating cycle on the basis of such evaluation.

* * * * *